United States Patent
Huenemoerder

(10) Patent No.: US 11,040,600 B2
(45) Date of Patent: Jun. 22, 2021

(54) ARRANGEMENT AND METHOD FOR DE-ICING A HEAT EXCHANGER

(71) Applicants: DENSO AUTOMOTIVE Deutschland GmbH, Eching (DE); DENSO CORPORATION, Kariya (JP)

(72) Inventor: Werner Huenemoerder, Eching (DE)

(73) Assignees: DENSO AUTOMOTIVE Deutschland GmbH, Eching (DE); DENSO CORPORATION, Kariya (JP)

(*) Notice: Subject to any disclaimer, the term of this patent is extended or adjusted under 35 U.S.C. 154(b) by 53 days.

(21) Appl. No.: 16/025,018

(22) Filed: Jul. 2, 2018

(65) Prior Publication Data

US 2019/0009647 A1 Jan. 10, 2019

(30) Foreign Application Priority Data

Jul. 6, 2017 (DE) .......................... 102017115190.7

(51) Int. Cl.
*B60H 1/32* (2006.01)
*B60H 1/00* (2006.01)
(Continued)

(52) U.S. Cl.
CPC ......... *B60H 1/321* (2013.01); *B60H 1/00392* (2013.01); *B60H 1/22* (2013.01);
(Continued)

(58) Field of Classification Search
CPC ...... B60H 1/321; B60H 1/00392; B60H 1/22; B60H 1/00521; B60H 2001/00114;
(Continued)

(56) References Cited

U.S. PATENT DOCUMENTS

| 5,284,025 A * | 2/1994 | Kajitani ............. B60H 1/00392 62/160 |
| 8,118,087 B2 * | 2/2012 | Saida ................. B60H 1/00828 165/202 |
| 9,102,214 B2 * | 8/2015 | Kishi ................. B60H 1/00849 |
| 2004/0069481 A1 | 4/2004 | Ebara et al. |

(Continued)

FOREIGN PATENT DOCUMENTS

| CN | 103496311 A | 1/2014 |
| CN | 103906636 A | 7/2014 |

(Continued)

*Primary Examiner* — Jon T. Schermerhorn, Jr.
(74) *Attorney, Agent, or Firm* — Harness, Dickey & Pierce, P.L.C.

(57) ABSTRACT

An arrangement for de-icing a heat exchanger includes an air guiding housing and at least one fan. The air guiding housing is configured to take in an air from an outside of a motor vehicle through an inlet opening and to discharge the air from an outlet opening. The fan is positioned between the inlet opening and the outlet opening inside the air guiding housing and is configured to circulate the air in the air guiding housing. The heat exchanger is positioned between the inlet opening and the outlet opening inside the air guiding housing and allows the air to pass therethrough, thereby being configured to cool the air. The inlet opening and the outlet opening each are configured to be closed. The air guiding housing is configured to cause a circulation flow therein when the fan is operated while the inlet opening and the outlet opening are closed.

12 Claims, 4 Drawing Sheets

(51) Int. Cl.
  *B60L 1/00* (2006.01)
  *B60H 1/22* (2006.01)
  *B60L 1/02* (2006.01)
  *B60K 11/04* (2006.01)
  *B60K 11/06* (2006.01)

(52) U.S. Cl.
  CPC .............. *B60K 11/04* (2013.01); *B60K 11/06* (2013.01); *B60L 1/003* (2013.01); *B60L 1/02* (2013.01); *B60H 1/00521* (2013.01); *B60H 2001/003* (2013.01); *B60H 2001/00114* (2013.01); *B60H 2001/2281* (2013.01); *B60H 2001/2296* (2013.01)

(58) Field of Classification Search
  CPC ...... B60H 2001/003; B60H 2001/2281; B60K 11/04; B60K 11/06; B60L 1/003; B60L 1/02
  See application file for complete search history.

(56) References Cited

U.S. PATENT DOCUMENTS

| | | | | |
|---|---|---|---|---|
| 2008/0283215 | A1* | 11/2008 | Saida | B60H 1/00828 165/43 |
| 2014/0194048 | A1* | 7/2014 | Wittmann | B60H 1/0005 454/139 |
| 2014/0298838 | A1 | 10/2014 | Morishita et al. | |
| 2015/0136353 | A1* | 5/2015 | Niemann | B60H 1/00207 165/41 |

FOREIGN PATENT DOCUMENTS

| | | |
|---|---|---|
| DE | 19731369 C1 | 7/1998 |
| DE | 10317039 A1 | 10/2004 |
| DE | 102014117950 A1 | 6/2016 |
| EP | 1 273 467 | 1/2003 |
| JP | H05-155244 A | 6/1993 |
| JP | 2003-170733 A | 6/2003 |
| JP | 2015101333 A | 6/2015 |
| JP | 2016-013806 A | 1/2016 |

\* cited by examiner

US 11,040,600 B2

ARRANGEMENT AND METHOD FOR DE-ICING A HEAT EXCHANGER

CROSS REFERENCE TO RELATED APPLICATION

This application is based on and claims the benefit of priority from German Patent Application No. DE 10 2017 115 190.7 filed on Jul. 6, 2017. The entire disclosure of the application is incorporated herein by reference.

TECHNICAL FIELD

The present disclosure relates to an arrangement and a method for de-icing a heat exchanger, in particular for use with a heat pump in a motor vehicle.

BACKGROUND

Heat exchangers may be frosted when heat is transferred from a surrounding fluid to a work fluid, typically a refrigerant, circulating in a circuit, and this heat transfer takes place at a surrounding temperature of 0° C. or below. Such heat exchangers are used with heat pumps, in particular for heat extraction/production.

Outside air is known as a typical surrounding fluid in which the hypothermic humidity freezes out and the air-side heat exchange section is blocked. In order to avoid a functional impairment, such a heat exchanger is configured to be regularly de-iced, where necessary. For example, this abnormality, e.g., the frost formation, may occur in particular with external heat exchangers in which air (or surrounding air) flowing therethrough has a low temperature without being pre-heated at all, or without being pre-heated sufficiently.

SUMMARY

This section provides a general summary of the disclosure, and is not a comprehensive disclosure of its full scope or all of its features.

The object of the present disclosure is to provide an arrangement and a method for de-icing a heat exchanger which enables a possibly energy efficient operation and can be achieved without or at most with minimal additional construction space requirements.

According to an aspect of the present disclosure, an arrangement for de-icing a heat exchanger in a motor vehicle includes an air guiding housing and at least one fan. The air guiding housing includes an inlet opening and an outlet opening. The air guiding housing is configured to take in an air from an outside of the motor vehicle through the inlet opening and to discharge the air from the outlet opening. The at least one fan is positioned between the inlet opening and the outlet opening inside the air guiding housing and is configured to circulate the air in the air guiding housing. The heat exchanger is positioned between the inlet opening and the outlet opening inside the air guiding housing, allows the air to pass therethrough, and is configured to cool the air. The inlet opening and the outlet opening each are configured to be closed. The air guiding housing is configured to cause a circulation flow therein when the at least one fan is operated while the inlet opening and the outlet opening are closed.

According to an aspect of the present disclosure, a method for de-icing a heat exchanger in an arrangement, e.g., the above-described arrangement, includes (i) closing the inlet opening and the outlet opening and (ii) forming the circulation flow in the air guiding housing. The bypass channel is optionally open and/or the fan is operated to cause a pressure difference between one side and an other side of the partition wall.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

It is generally known to briefly heat a heat exchanger for de-icing the heat exchanger. De-icing is not limited to mean melting a frozen heat exchanger and may mean removing both ice and frost from the heat exchanger. Thus, de-icing will be referred to as defrosting hereinafter. The defrosting can be performed in various ways. For example, an electric auxiliary heater may be mounted to be in direct thermal contact with the heat exchanger to be configured to heat the heat exchanger directly. Alternatively, an electric auxiliary heater may be mounted to heat up air such as outside air (i.e., the surrounding air) before the air passes through the heat exchanger.

For example, EP 1273 467 A1 discloses a configuration in which hot refrigerant is briefly supplied to an external heat exchanger arranged outside the vehicle. The patent literature further discloses that the air inflow rate in front of and/or the air outflow rate behind the external heat exchanger can be regulated for the purposes of defrosting.

Generally, the defrosting is required to be performed with high energy efficiency. However, electric vehicles may generate no waste heat that is available for the defrosting, especially when a temperature of outside air, which is air outside the electric vehicles, is low. As such, the range of the electric vehicle is reduced. In addition, conventional arrangements are also partially susceptible to ice/frost formed in the external heat exchanger or to ice/frost briefly melted.

The present disclosure addresses the above-described issues and provides an advantageous arrangement of a heat exchanger and a method for defrosting/de-icing the heat exchanger.

A plurality of embodiments of the present disclosure will be described hereinafter referring to drawings.

Figure 1:
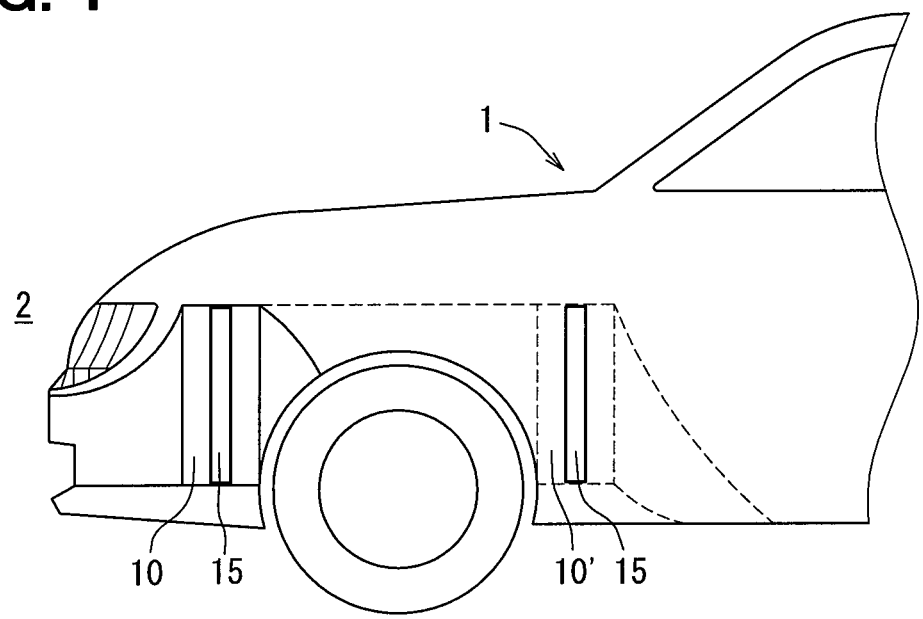
FIG. 1 is a diagram illustrating a motor vehicle having an arrangement for de-icing a heat exchanger according to at least one embodiment.

FIG. 1 shows a general concept of the present disclosure. Specifically, FIG. 1 shows a motor vehicle 1 that is configured to perform defrosting/de-icing of a first heat exchanger 15 by using the arrangement. The arrangement includes an air guiding housing 10. The air guiding housing 10 is configured to guide the outside air from a front region of the motor vehicle 1. The term "guiding" here may mean introducing the outside air and backwardly discharging the outside air, wherein a temporary circulation of the introduced outside described later is also included.

The air guiding housing 10 includes a lockable part. In FIG. 1, reference numeral 10 points to the lockable part. The air guiding housing 10 (i.e. the lockable part thereof) may be installed relatively far in front in the motor vehicle 1. In other words, the lockable part of the air guiding housing 10 may be distanced from a front end of the motor vehicle 1. Alternatively, the air guiding housing 10 may be further behind, for example arranged behind a front axis (i.e., a front axle) of the motor vehicle 1. In other words, the air guiding housing 10 may be positioned further away from the front end of the motor vehicle 1 as shown as the air guiding housing 10' in FIG. 1. The air guiding housing 10' may be positioned behind the front axle of the motor vehicle 1 in the front-rear direction.

The arrangement including the air guiding housing 10 or the air guiding housing 10' can be changed to be more advantageous depending on a design of the motor vehicle 1. The arrangement including the air guiding housing 10 may be advantageous when the motor vehicle 1 mounts a motor. In this case, a motor cooler and an exterior heat exchanger of an air conditioner may be positioned directly behind the front end of the motor vehicle 1 or may be positioned adjacent to the front end of the motor vehicle 1. In contrast, the arrangement including the air 30o guiding housing 10' may be advantageous when the motor vehicle 1 mounts a battery. In this case, a battery cooler may be positioned further away from the front end of the motor vehicle 1 as compared to the motor cooler.

Though the air guiding housing 10 and the air guiding housing 10' are mounted at different locations, have the same structure. Therefore the following explanation will be directed toward the air guiding housing 10, and a configuration regarding the air guiding housing 10 will be described hereafter.

First Embodiment

A first embodiment will be described hereafter referring to FIG. 2 and FIG. 3. A lower half portion graphically shown in FIG. 2 corresponds to a right half portion in FIG. 3. An upper half portion graphically shown in FIG. 2 corresponds to a left half portion in FIG. 3. The arrangement is configured to switch between two different switching states.

Figure 2:
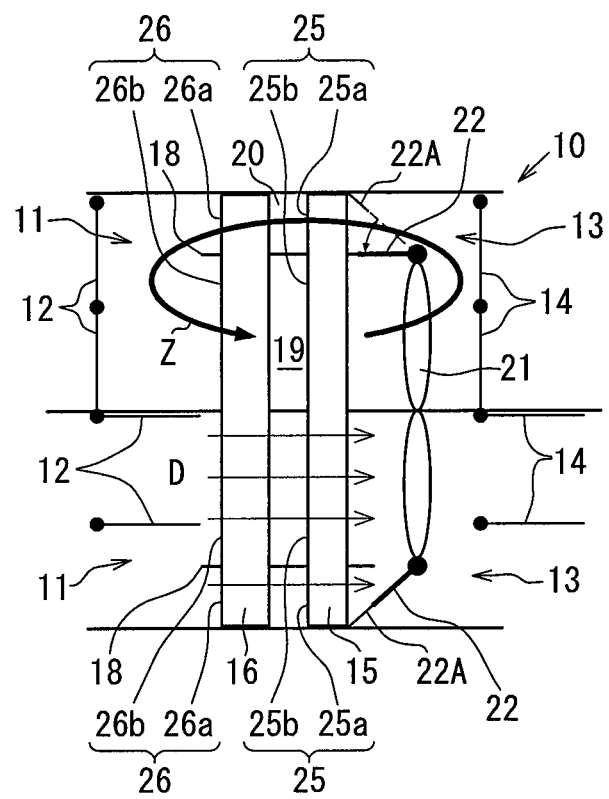
FIG. 2 is a top view of the arrangement according to a first embodiment.
Figure 3:
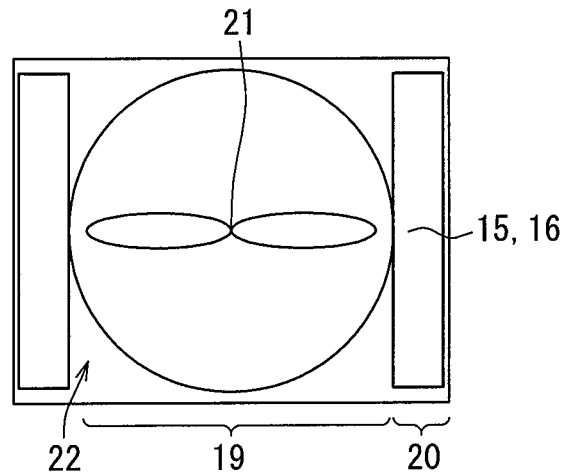
FIG. 3 is a front view of the arrangement shown in FIG. 2.

As shown in FIG. 2, the arrangement includes the air guiding housing 10 and a fan 21. A quantity of the fan 21 is not limited to a specified quantity and may be at least one. In the present embodiment, one fan 21 is mounted. The air guiding housing 10 defines an inlet opening 11 and an outlet opening 13 therein and houses an inlet flap 12 and an outlet flap 14 therein. The air guiding housing 10 is configured to take in air (i.e., the outside air) from the outside 2 of the motor vehicle 1 through the inlet opening 11 and to discharge the air from the outlet opening 13. The air guiding housing 10 allows the air to flow from the inlet opening 11 to the outlet opening 13 along a flow direction D.

The inlet flap 12 is configured to open and closes the inlet opening 11. The outlet flap 14 is configured to open and closes the outlet opening 13.

When the inlet flap 12 opens the inlet opening 11, an inside of the air guiding housing 10 comes in communication with the outside 2 of the motor vehicle 1 through the inlet opening 11. Specifically, a channel (not shown) extends from the front end of the motor vehicle 1 to the inlet opening 11 such that the inside of the air guiding housing 10 comes in communication with the outside 2 through the channel.

When the inlet flap 12 closes the inlet opening 11 and the outlet flap 14 closes the outlet opening 13, the outside air does not flow into the air guiding housing 10. A quantity of the inlet flap 12 and a quantity of the outlet flap 14 each are not limited to a specified quantity and may be at least one.

The first heat exchanger 15 and a second heat exchanger 16 are positioned between the inlet opening 11 and the outlet opening 13 and are arrange along the flow direction D inside the air guiding housing 10. The first heat exchanger 15 is located downstream of the second heat exchanger 16 in the flow direction D.

The first heat exchanger 15 and the second heat exchanger 16 each are arranged substantially across the full width and height of the air guiding housing 10. In other words, the first heat exchanger 15 and the second heat exchanger 16 each extend substantially across a whole of the air guiding housing 10 along both of a width direction and a height direction of the air guiding housing 10. In the present embodiment, a dimension of the air guiding housing 10 in the width direction is greater than a dimension of the air guiding housing 10 in the height direction as shown in FIG. 3.

The fan 21 is positioned downstream of the first heat exchanger 15 in the flow direction D. The fan 21 may be positioned proximate to the first heat exchanger 15, i.e., positioned directly behind the first heat exchanger 15 or may be a specified distance away from the first heat exchanger 15. The fan 21 is configured to cause a flow of air passing through the air guiding housing 10 along the flow direction D from the inlet opening 11 to the outlet opening 13 when the inlet opening 11 and the outlet opening 13 are open.

A fan cross-section, which is an area defined by a trace of the fan 21, extends across substantially a whole of the air guiding housing 10 in the height direction however does not extend across a whole of the air guiding housing 10 in the width direction. The fan cross-section has a circular shape as shown in FIG. 3.

The fan 21 is also configured to cause a circulation flow Z when the inlet opening 11 and the outlet opening 13 are closed. In the present embodiment, the fan 21 causes the circulation flow Z together with a partition wall 18 positioned inside the air guiding housing 10.

A mechanism for causing the circulation flow Z will be described in detail hereafter.

The partition wall 18 is arranged in an end portion of at least one of the first heat exchanger 15 and the second heat exchanger 16 in the width direction (i.e., a lateral direction). The partition wall 18 is arranged asymmetrically relative to the fan 21, e.g. is arranged laterally offset from the fan 21. In other words, the partition wall 18 is not overlap with the fan 21 when viewed in an axial direction of the fan 21. The axial direction of the fan 21 is substantially parallel to the flow direction D.

The partition wall 18 divides a surface of the at least one of the first heat exchanger 15 and the second heat exchanger 16 into two or more surfaces arranged one another along the width direction of the air guiding housing 10 perpendicular to the flow direction D. The surface may have a non-square shape.

In the present embodiment, two partition walls 18 are arranged to face each other in the width direction and to extend across both of the first heat exchanger 15 and the second heat exchanger 16 along the flow direction D. In other words, the two partition walls 18 each extend perpendicular to the first heat exchanger 15 and the second heat exchanger 16. The two partition walls 18 are positioned at end portions of the fan 21 in the width direction respectively such that both of the two partition walls 18 are not overlap with the fan 21 when viewed in the axial direction.

The two partition walls 18 define a main channel 19 and two side channels 20. The main channel 19 is defined between the two partition wall 18 and allows the air to flow therethrough. The side channels 20 are defined between the two partition walls 18 and the air guiding housing 10.

The two partition walls 18 have the same structure and the upper half portion and the lower half portion shown in FIG. 2 have symmetric configuration, therefore the following explanation will be directed toward one of the two partition walls 18, referred to as the partition wall 18, and a configuration regarding the partition wall 18 will be described hereafter.

The partition wall 18 divides a surface 25 of the first heat exchanger 15 into a first side surface 25a and a first main surface 25b and divides a surface 26 of the second heat exchanger 16 into a second side surface 26a and a second main surface 26b. The first side surface 25a and the second side surface 26a face each other along the flow direction D respectively. The first main surface 25b and the second main surface 26b face each other along the flow direction D.

The first side surface 25a and the second side surface 26a each are located between the partition wall 18 and the air guiding housing 10. Accordingly, the side channel 20 allows the air to flow therethrough and to pass through the first side surface 25a and the second side surface 26a. The first side surface 25a and the second side surface 26a include corners and edges of the first heat exchanger 15 and the second heat exchanger 16 located outside the fan cross-section. That is, the first side surface 25a and the second side surface 26a including the corners and the edges are located outside of the fan cross-section.

The two main channels 19 are located in the fan cross-section when viewed along the axial direction of the fan 21. In other words, the fan 21 is arranged in the main channel 19. The main channel 19 allows the air to flow therethrough and to pass the first main surface 25b and the second main surface 26b.

The main channel 19 and the side channel 20 extend parallel to each other. Therefore, a direction along which the air flows through the main channel 19 is parallel to a direction along which the air flows through the side channel 20.

The fan 21 includes a fan frame inclined with respect to the flow direction D. Specifically, the fan frame is tapered toward the downstream side. The fan frame is formed by a frame attachment 22A and a plate door 22. The frame attachment 22A extends from the air guiding housing 10 toward the fan 21. The plate door 22 is configured to be positioned selectively at a first position and a second position. Specifically, the plate door 22 is configured to be positioned at the first position when the inlet opening 11 and the outlet opening 13 are open and is configured to be positioned at the second position when the inlet opening 11 and the outlet opening 13 are closed.

The first position is shown in the lower half portion of FIG. 2. At the first position, the plate door 22 connects to the frame attachment 22A between the first heat exchanger 15, which is to be defrosted, and the fan 21. Accordingly, the plate door 22 defines the side channel 20 together with the frame attachment 22A and guides the air, which flows through the side channel 20 along the flow direction D, to flow into the fan 21.

More specifically, when the plate door 22 is at the first position, the plate door 22 forms a funnel-shaped path together with the frame attachment 22A. As a result, an air mixing performance for collecting flows of the air, which flows through the main channel 19 and the side channel 20 while passing through the first side surface 25a, the first main surface 25b, the second side surface 26a and the second main surface 26b, can be improved.

Since the fan frame is tapered toward the fan 21, the fan frame ensures that the air flowing through the side channel 20 flows into the fan 21. Thus, the air flowing through the side channel 20 barely joins the air flowing through the main channel 19 before reaching the fan 21 when the inlet opening 11 and the outlet opening 13 are open and the plate door 22 is at the first position.

The second position is shown in the upper half portion of FIG. 2. At the second position, the plate door 22 separates apart from the frame attachment 22A and connects to the partition wall 18 to extend the side channel 20 to the radial end of the fan 21. That is, the plate door 22 defines the main channel 19 and the side channel 20 together with the partition plate 18.

The radial end is an end of the fan 21 in a radial direction of the fan 21 perpendicular to the axial direction. In the arrangement of the present embodiment, the radial end corresponds to an end of the fan 21 in the width direction. Accordingly, when the plate door 22 is at the second position shown in the upper portion in FIG. 2, the fan 21 does not directly draw the air from the side channel 20 while drawing the air from the main channel 19 directly.

In addition, when the plate door 22 is at the second position, the side channel 20 serves as a back flow channel that allows the air to flow therethrough in an opposite direction opposite from the flow direction D. In other words, the side channel 20 allows the circulation flow Z to flow therethrough.

Specifically, when the fan 21 draws air from the main channel 19, a positive pressure is caused around the outlet flaps 14. The air passing through the fan 21 turns around the plate door 22 due to the positive pressure, therefore the air flows through the side channel 20 in the opposite direction opposite to the flow direction D.

More specifically, the air flowing through the main channel 19 flows into the fan 21, and turns around the partition wall 18 on a downstream side of the fan 21, and then flows into the side channel 20, when the inlet opening 11 and the outlet opening 13 are closed and the plate door 22 is at the second position. Thus, the circulation flow Z is caused.

As described above, in order to cause the circulation flow Z, the partition wall 18 can be arranged relative to the fan 21 in a simple manner in such a way that the opposite air flows are formed on both sides of the partition wall 18 when operating the fan 21.

A cross-sectional area of the main channel 19 is larger than a cross-sectional area of the side channel 20. In other words, the wide central main channel 19 and the narrower side channel 20 are formed. As a result, a pressure difference occurs between both sides of the partition wall 18, which maintains the circulation flow Z. In the present embodiment, the fan 21 is not necessarily arranged directly behind the first heat exchanger 15.

By arranging the partition wall 18 as described above, any additional space is not necessarily provided to house the partition wall 18. Accordingly, a space-saving effect can be obtained, therefore an increase of an external size of the air guiding housing 10 for housing the arrangement can be suppressed.

According to the asymmetrical arrangement of the partition wall 18 and the fan 21, the opposite airflows flowing along the opposite directions are formed on both sides of the at least one partition wall 18 when the fan 21 is operated, or the pressure difference occurs between the opposing sides of the at least one partition wall 18 when the fan 21 is operated. As such, the circulation flow Z is formed.

A method for de-icing the first heat exchanger 15 will be described hereafter.

The method includes:
closing the inlet opening 11 and outlet opening 13; and
forming the circulation flow Z in the air guiding housing 10.

The first heat exchanger 15 may be frosted or iced when being operated in an operation mode in which the outside air is cooled. The heat exchanging performance of the first heat exchanger 15 may deteriorate when the first heat exchanger 15 is frosted or iced. Therefore, the first heat exchanger 15 is necessarily defrosted, i.e., de-iced. The first heat exchanger 15 may be an exterior heat exchanger serving as an evaporator in a refrigerant circuit and is configured to be operated in the heat pump mode.

The second heat exchanger 16 may be a cooler (or a water cooler) mounted to a cooling circuit. The second heat exchanger 16 is configured to transfer heat to air flowing therethrough. For example, the second heat exchanger 16 is configured to allow cooling water to flow therethrough and therefore transferring waste heat, which is generated by a device, to the air through the cooling water.

The device may be any devices depending on types of vehicles. For example, the device may be an electrical component, hydraulic working system, and a combustion motor. The method for transferring the heat is not limited to the above-described example. The heat may be transferred briefly from hot refrigerant flowing through the second heat exchanger 16 to the first heat exchanger 15. Alternatively, the heat may be generated by an electric auxiliary heater or may be supplied from a heat reservoir. Alternatively, the heat may be transferred from inside air, which is air inside a vehicle compartment.

The first heat exchanger 15 may be determined whether to be defrosted, i.e., de-iced, based on various parameters. For example, the first heat exchanger 15 may be determined to be defrosted when a pressure of a fluid flowing therethrough falls. Alternatively, the first heat exchanger 15 may be determined to be defrosted based on a temperature signal. Alternatively, a defrosting, i.e., a de-icing operation, may be performed prophylactically under certain conditions.

If a freezing state of the first heat exchanger 15 is recognised and assessed in such a way that a de-icing is necessary, the inlet flaps 12 and outlet flaps 14 close the inlet opening 11 and the outlet opening 13. Then, measures are introduced in order to form the circulation flow Z in the air guiding housing 10. Since the circulation flow Z is formed only by closing the inlet opening 11 and outlet opening 13, the fan 21 is only required to be operated in a normal state.

In other words, when the first heat exchanger 15 is determined to be defrosted, the inlet flap 12 and the outlet flap 14 close the inlet opening 11 and the outlet opening 13, and the plate door 22 is positioned at the second position such that the circulation flow Z is caused. In the circulation flow Z, the air flows through the second heat exchanger 16 and the first heat exchanger 15 in this order. As described above, the second heat exchanger 16 transfers heat to the air to heat the air. As a result, the heated air flows through the first heat exchanger 15, therefore the first heat exchanger 15 is defrosted, i.e., de-iced.

Here, when the air guiding housing 10 is closed, i.e. when the inlet opening 11 and the outlet opening 13 are closed, a temperature of the air in the circulation flow Z is permanently increased by the second heat exchanger 16. As a result, the air having a high temperature absorbs a large amount of water vapour in the circulation flow Z and thus the first heat exchanger 15 can be de-iced more quickly.

It should be understood that closing the inlet opening 11 and the outlet opening 13 also includes reducing an opening degree of the inlet opening 11 or an opening degree of the outlet opening 13. It means that a small leakage of the air from the inlet opening 11 or the outlet opening 13 may be permitted for the following reasons. First, the inlet opening 11 and the outlet opening 13 may not be sealed completely due to a dynamic pressure when the fan 21 is operated. Second, the small leakage may be desirable in order to enable supplying fresh air with a small volume and removing an air saturated with water vapour.

The inlet flap 12, the outlet flap 14, and the plate door 22 is operated by a controller. The determination for determining whether the first heat exchanger 15 to be defrosted, i.e., de-iced, may be performed by the controller.

The controllers and methods described in the present disclosure may be implemented by a special purpose computer created by configuring a processor programmed to execute one or more particular functions embodied in computer programs. Alternatively, the apparatuses and methods described in the present disclosure may be implemented by special purpose hardware logic circuits. Further alternatively, the apparatuses and methods described in the present disclosure may be implemented by a combination of one or more special purpose computers created by configuring a processor executing computer programs and one or more hardware logic circuits.

Second Embodiment

A second embodiment is described with reference to FIG. 4. Parts and features in the second embodiment may have the same reference numerals as corresponding parts and features described in the first embodiment and a redundant description of such parts and features may be omitted.

Figure 4:
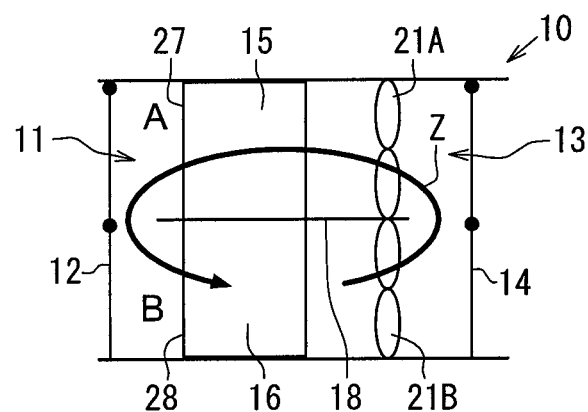
FIG. 4 is a lateral sectional view of the arrangement according to a second 3o embodiment in a state where an inlet opening and an outlet opening are closed.

FIG. 4 shows a state where the inlet flap 12 closes the inlet opening 11 and the outlet flap 14 closes the outlet opening 13.

In FIG. 4, the first and second heat exchangers 15, 16 are arranged next to each other or one above the other, such that they are flowed through in parallel with normal through-flow, i.e. with open inlet opening 11 and outlet opening 13. In other words, the first heat exchanger 15 and the second heat exchanger 16 are arranged to be proximate to each other in the up-down direction of the motor vehicle 1.

The partition wall 18 is arranged centrally and partitions a surface 27 of the first heat exchanger 15 and a surface 28 of the second heat exchangers 16 from each other. In other words, the partition wall 18 is positioned between the first heat exchanger 15 and the second heat exchanger 16 to define a first passage A (or a first region) and a second passage B (or a second region). The first passage A allows the air to flow therethrough and to pass through the first heat exchanger 15. The second passage B allows the air to flow therethrough and to pass through the second heat exchanger 16.

In the present embodiment, the fan 21 is arranged in the direction of the outlet flap 14 in the first and second regions. Specifically, the fan 21 includes a first fan 21A positioned in the first passage A and a second fan 21B positioned in the second passage B. The partition wall 18 is positioned asymmetrically relative to one of the first fan 21A and the second fan 21B. In the present embodiment, the partition wall 18 is positioned between the first fan 21A and the second fan 21B and extends across the first fan 21A and the second fan 21B along the flow direction D.

In the first passage A, the air flows along the opposite direction opposite to the flow direction D and passes through the first heat exchanger 15. Specifically, in the first passage A, the air flows from the first fan 21A into the first heat exchanger 15, flows out of the first heat exchanger 15 from the surface 27. The air, which flows out of the first heat exchanger 15, turns around the partition wall 18 and flows into the second passage B.

In the second passage B, the air flows along the flow direction D and passes through the second heat exchanger 16. Specifically, the air flows into the second heat exchanger 16 from the surface 28, flows out of the second heat exchanger 16, and then flows into the second fan 21B.

Thus, a direction, along which the air flows through the first passage A, and a direction, along which the air flows through the second passage B, are parallel to each other and opposite to each other.

In the present embodiment, when one of the first and second fans 21A, 21B is operated while the inlet opening 11 and the outlet opening 13 are closed, the asymmetrical arrangement of the one of the first and second fans 21A, 21B in relation to the partition wall 18 causes the circulation flow Z. In other words, the first and second fans 21A, 21B are operated asymmetrically by turning off one of the first and second fans 21A, 21B.

Alternatively, only one fan 21 may be arranged as in the first embodiment. In this case, the one fan 21 is arranged asymmetrically relative to the partition wall 18. In this case, the asymmetrical arrangement of the fan 21 in relation to the partition wall 18 causes the circulation flow Z.

Third Embodiment

A third embodiment is described with reference to FIG. 5. Parts and features in the third embodiment may have the same reference numerals as corresponding parts and features described in the preceding embodiments and a redundant description of such parts and features may be omitted.

Figure 5:
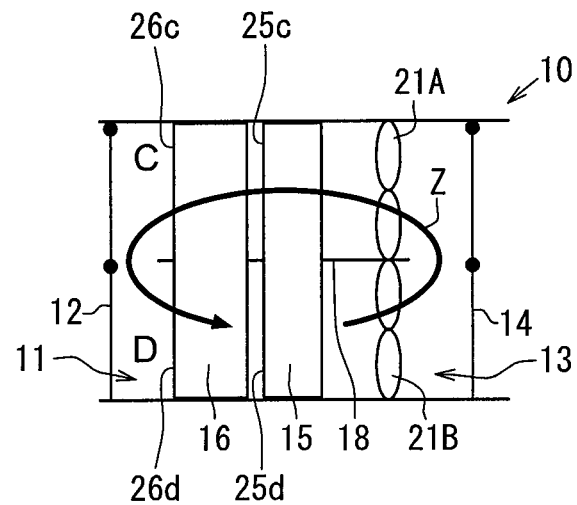
FIG. 5 is a lateral sectional view of the arrangement according to a third embodiment in a state where an inlet opening and an outlet opening are closed.

FIG. 5 shows a state where the inlet flap 12 closes the inlet opening 11 and the outlet flap 14 closes the outlet opening 13.

In FIG. 5, the first heat exchanger 15 and the second heat exchanger 16 are arranged one behind the other, such that they are flowed through in parallel with normal through-flow, i.e. with open inlet opening 11 and outlet opening 13. In other words, the first heat exchanger 15 and the second heat exchanger 16 are arranged to be proximate to each other in the flow direction D. Specifically, the first heat exchanger 15 is positioned downstream of the second heat exchanger 16 as in the first embodiment.

The partition wall 18 divides the surface 25 of the first heat exchanger 15 into a first surface 25c and a second surface 25d and divides the surface 26 of the second heat exchanger 16 into a third surface 26c and a fourth surface 26d. In the present embodiment, the partition wall 18 is arranged centrally. As such, an area of the first surface 25c and an area of the second surface 25d are substantially the same. Similarly, an area of the third surface 26c and an area of the fourth surface 26d are substantially the same.

The partition wall 18 defines a third passage C and a fourth passage D. The third passage C allows the air to flow therethrough and to pass the first surface 25c and the second surface 26c. The fourth passage C allows the air to flow therethrough and to pass the second surface 25d and the fourth surface 26d.

In the present embodiment, the fan 21 includes a first fan 21A and a second fan 21B. The first fan 21A and the second fan 21B are arranged in the direction of the outlet flap 14 in each of the third passage C and the fourth passage D respectively. In other words, the first fan 21A and the second fan 21B are positioned in the third passage C and the fourth passage D respectively and are arranged one another along the radial direction of the first and second fans 21A, 21B.

When one of the first fan 21A and the second fan 21B are operated while the inlet opening 11 and the outlet opening 13 are closed, the asymmetrical arrangement of the one of the two fans 21 in relation to the partition wall 18 causes the circulation flow Z. In other words, the first fan 21A and the second fan 21B are operated asymmetrically by turning off one of the two fans 21.

Alternatively, only one fan 21 may be arranged as in the first embodiment. In this case, the one fan 21 is arranged asymmetrically relative to the partition wall 18. In this case, the asymmetrical arrangement of the fan 21 in relation to the partition wall 18 causes the circulation flow Z.

When the circulation flow Z is caused, the third passage C allows the air to flow therethrough along the opposite direction opposite to the flow direction D and to pass through the first heat exchanger 15 and the second heat exchanger 16 in this order. Specifically, in the third passage C, the air flows from the first fan 21A into the first heat exchanger 15, flows out of the first heat exchanger 15 from the first surface 25c, flows into the second heat exchanger 16, and then flows out of the second heat exchanger 16 from the third surface 26c. Subsequently, the air, which flows out of the second heat exchanger 16, turns around the partition wall 18 and flows into the fourth passage C.

When the circulation flow Z is caused, the fourth passage D allows the air to flow therethrough along the flow direction D and to pass through the second heat exchanger 16 and the first heat exchanger 15 in this order. Specifically, the air flows into the second heat exchanger 16 from the fourth surface 26d, flows out of the second heat exchanger 16, flows into the first heat exchanger 15 from the second surface 25d, flows out of the first heat exchanger 15, and then flows into the second fan 21B.

Fourth Embodiment

A fourth embodiment is described with reference to FIG. 6A and FIG. 6B. Parts and features in the third embodiment may have the same reference numerals as corresponding parts and features described in the preceding embodiments and a redundant description of such parts and features may be omitted.

In the present embodiment, a bypass channel 23 is optionally opened and/or the fan 21 is operated in such a way that the pressure difference is caused between the opposing sides of the at least one partition wall 18. The partition wall 18 is arranged laterally next to the fan 21 and the two heat exchangers 15, 16 arranged one behind the other, such that the bypass channel 23 is formed.

In other words, the partition wall 18 is positioned on one side of the fan 21, the first heat exchanger 15, and the second heat exchanger 16 in the width direction (or the lateral direction/the radial direction). In other words, the partition wall 18 is positioned between the air guiding housing 10 and the first and second heat exchangers 15, 16 in the width direction (or the lateral direction/the radial direction). The partition wall 18 extends along the axial direction from an upstream side of the second heat exchanger 16 to a downstream side of the fan 21. The first heat exchanger 15 is positioned between the second heat exchanger 16 and the fan 21 along the axial direction of the fan 21. The partition wall 18 defines the bypass channel 23 together with the air guiding housing 10.

A switching device is positioned in the bypass channel 23 to open and closes the bypass channel 23. The switching device may be a flap 24, which is movable in the flow direction D (from the inlet opening 11 in the direction of the outlet opening 13) and/or is pre-tensioned in the flow direction D. Thus, the flap 24 corresponds to a switching device of the present disclosure.

In the fourth embodiment, the flap 24 is pre-tensioned in the flow direction D along which the air flows from the inlet opening 11 to the outlet opening 13. In other words, the flap 24 is configured to receive a tension pulling the flap 24 along the flow direction D. As a result, the flap 24 closes the bypass channel 23 automatically when the inlet opening 11 and the outlet opening 13 are open by the inlet flap 12 and the outlet flap 14 as shown in FIG. 6B. By suitably selecting the pretension, it can be achieved that the flap 24 opens automatically.

When the outside air is flowing through normally along the flow direction D, 2o resistance of the flap 24 can be adjusted sufficiently in a manner that the flap 24 seals the bypass channel 23. Yet by closing the inlet opening 11 and the outlet opening 13, the bypass channel 23 allows the air to flow therethrough along the opposite direction opposite to the flow direction D in the circulation flow Z. As a result, the bypass channel 23 is opened automatically. Thus, an active setting by a multiphase motor, for example, may not necessary.

Figure 6A:
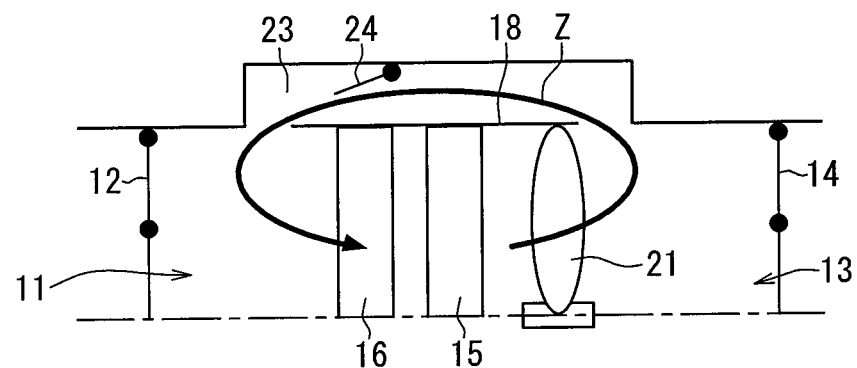
FIG. 6A is a lateral sectional view of the arrangement according to a fourth embodiment in a state where an inlet opening and an outlet opening are closed.
Figure 6B:
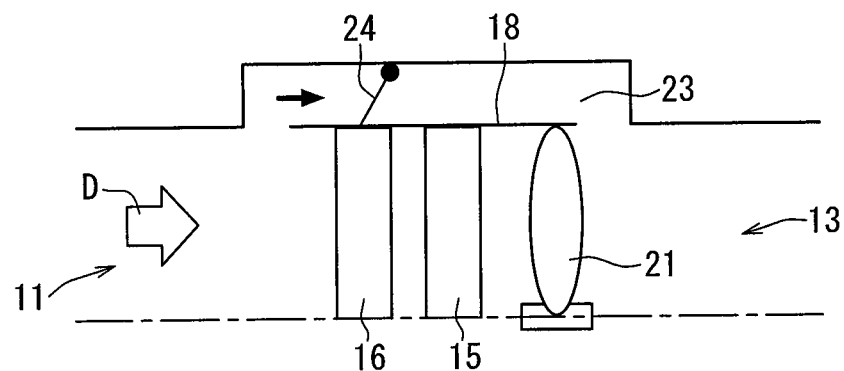
FIG. 6B is a lateral sectional view of the arrangement according to a fourth embodiment in a state where the inlet opening and the outlet opening are open.

As described above, the circulation flow Z is formed when inlet flap 12 and outlet flap 14 close the inlet opening 11 and the outlet opening 13 as shown in FIG. 6A. In other words, a return channel for the circulation flow Z can be caused by the bypass channel 23. In order to prevent the air from passing through the bypass channel 23 unnecessarily, the bypass channel 23 is configured to be closed in normal operation. Two bypass channels 23 may be formed on opposing sides of the first heat exchanger 15 and the second heat exchanger 16.

Fifth Embodiment

A fifth embodiment is described with reference to FIG. 7A, FIG. 7B, and FIG. 7C. Parts and features in the third embodiment may have the same reference numerals as corresponding parts and features described in the preceding embodiments and a redundant description of such parts and features may be omitted.

In the fifth embodiment, the bypass channel 23 is interrupted between the two heat exchangers 15 and 16. The flap 24 has an angled shape and can be positioned at three different positions selectively.

Specifically, the partition wall 18 includes a first partition wall 18a and a second partition wall 18b that are arranged to extend along the flow direction D (or the axial direction of the fan 21) and to be distanced from each other in the axial direction. The first partition wall 18a is located downstream of the second partition wall 18b.

More specifically, the first partition wall 18a is positioned between the first heat exchanger 15 and the air guiding housing 10 in the width direction and defines a first bypass channel 23a together with the air guiding housing 10. The first bypass channel 23a allows the air to flow therethrough while bypassing the first heat exchanger 15.

The second partition wall 18b is positioned between the second heat exchanger 16 and the air guiding housing 10 in the width direction and defines a second bypass channel 23b together with the air guiding housing 10. The second bypass channel 23b allows the air to flow therethrough while bypassing the second heat exchanger 16.

Figure 7A:
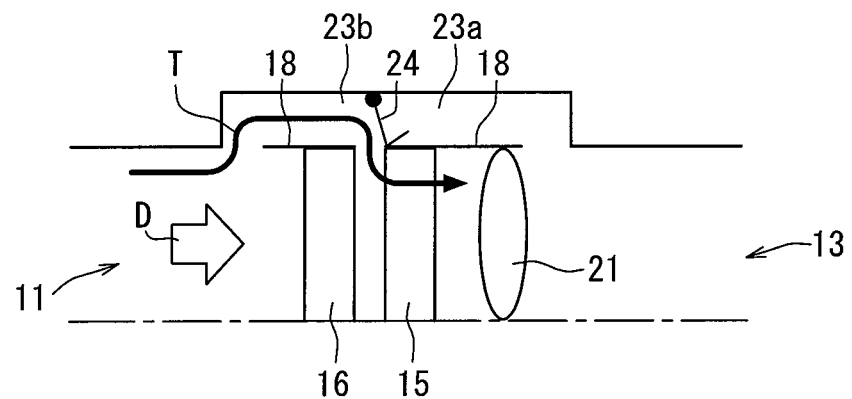
FIG. 7A is a lateral sectional view of the arrangement in a first state according to a fifth embodiment.

FIG. 7A shows a first state of the arrangement in the present embodiment. The first state corresponds to a first open state of the present disclosure. In the first state, only the back part of the bypass channel 23, i.e., only the first bypass channel 23a, is blocked by the flap 24. In other words, the flap 24 closes the first bypass channel 23a and opens the second bypass channel 23b in the first state where the inlet opening 11 and the outlet opening 13 are open. Accordingly, a partial bypass path T is formed, wherein only the front, i.e., the second heat exchanger 16, is bypassed. In other words, the partial bypass path T includes the second bypass channel 23b and allows the air flowing from the inlet opening 11 to flow through the second bypass channel 23b while bypassing the second heat exchanger 16 and to flow into the first heat exchanger 15 without flowing through the first bypass channel 23a.

In the first state, it is possible to improve the fresh air supply through an edge region of the first heat exchanger 15 toward the rear side. Positioning the flap 24 in the first state is advantageous when the first heat exchanger 15 serves as a condenser. The edge region can thus cool off better and, when necessary, improve the hypothermic degree of the first heat exchanger 15 operating in AC operation.

Figure 7B:
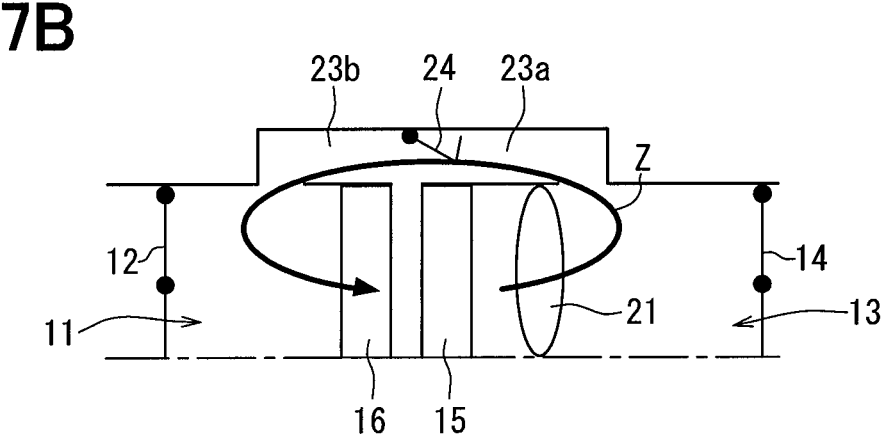
FIG. 7B is a lateral sectional view of the arrangement in a second state according to the fifth embodiment.

FIG. 7B shows a second state of the arrangement in the present embodiment. In the second state where the inlet opening 11 and the outlet opening 13 are closed, the flap 24 opens both of the first bypass channel 23a and the second bypass channel 23b. Accordingly, the circulation flow Z is formed as described in the fourth embodiment (see FIG. 6A).

Figure 7C:
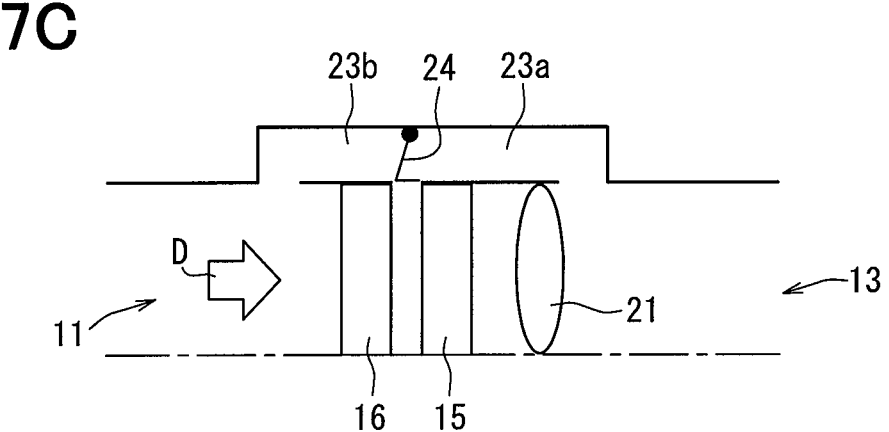
FIG. 7C is a lateral sectional view of the arrangement in a third state according to the fifth embodiment.

FIG. 7C shows a third state of the arrangement in the present embodiment. The third state corresponds to a second open state of the present disclosure. In the third state where the inlet opening 11 and the outlet opening 13 are open, the first bypass channel 23a and the second bypass channel 23b are completely closed. Specifically, an angled part of the flap 24 closes an intermediate space defined between the first heat exchanger 15 and the second heat exchanger 16. Accordingly, the air flowing from the inlet opening 11 flows through both of the second heat exchanger 16 and the first heat exchanger 15 in this order as described in the fourth embodiment (See FIG. 6B).

As described above, in the present embodiment, it can be provided that the flap 24 of the bypass channel 23 can set at least two open states.

In the first open state (or the first state shown in FIG. 7A), the flap 24 defines the bypass channel 23 past at least two heat exchangers arranged one behind the other. In the second state (or the third state shown in FIG. 7C), the flap 24 closes the bypass channel 23 in front of the first heat exchanger 15 at the back, such that only the front heat exchanger(s) is/are bypassed by the bypass channel 23. In the case of more than two heat exchangers arranged one behind the other, other switching patterns can also be simply achieved, such that the first or, optionally, the first heat exchanger 15 and the second heat exchanger 16 are bypassed. Depending on the operation mode, it can be advantageous that not all heat exchangers allow the air to pass therethrough. Only one region defined as a hypothermic area of the first heat exchanger 15 may allow the air to pass therethrough, in particular with a heat exchanger at the back. This is advantageous in an AC-operation such as a cooling operation, for example.

Other Embodiment

Aspects set forth below are examples of such variation of the present disclosure.

(1) The first heat exchanger 15 may belong to an indirect system (not shown). In this case, the first heat exchanger 15 of the refrigerant circuit does not take place a heat exchange using air flowing therethrough. Instead, the heat exchange may be performed at the heat source and at the heat sink using water or a water-based solution, for example a water-glycol mixture, which circulates in a secondary coolant circuit. In this case, the heat exchanger 15 to be de-iced may be arranged in the secondary coolant circuit and may be configured to perform the heat exchange with the outside air. Indirect systems may be particularly advantageous for electric vehicles, such as those disclosed in DE 10 2014 117 950 A1.

(2) In the above-described embodiments, the partition wall 18 is disposed to cause the circulation flow Z. However, no partition wall 18 may be provided. In this case, the fan 21 may be arranged proximate to the first heat exchanger 15 on the downstream side of the first heat exchanger 15 such that the fan 21 substantially draws air when the inlet flaps 12 and outlet flaps 14 close the inlet opening 11 and the outlet opening 13. The circulation flow Z is formed by the return flow through the corner and edge regions (not shown) of the first heat exchanger 15.

(3) In the above-described embodiment, two heat exchangers, i.e., the first heat exchanger 15 and the second heat exchanger 16, are disposed. Specifically, in the above-described embodiment, the first heat exchanger 15 and the second heat exchanger 16 are arranged one behind the other along the flow direction D. This arrangement may be advantageous in particular when an area of the surface 25 of the first heat exchanger 15 and an area of the surface 26 of the second heat exchanger 16 are similar to each other.

More than two heat exchangers may be disposed in the air guiding housing 10. The plurality of heat exchangers may be arranged next to each other, one above the other or angled relative to each other, depending on how this fits the best for the specific heat exchanger aggregate. The present disclosure is based on the present heat being distributed in the closed circuit for the de-icing function and adjusted in such a way that de-icing is possible.

When more than two heat exchangers are disposed, the plurality of heat exchangers may be positioned in the lockable part of the air guiding housing 10. For example, the additional heat exchanger may be mounted to a turbocharger circuit or a circuit with hydraulic fluid (not shown). When a plurality of heat exchangers are arranged, the first heat exchanger 15 is required to be located most downstream among the plurality of heat exchangers.

(4) The operation of the arrangement of the above-described embodiments may be performed in broad terms as follows. In normal operation, the first heat exchanger 15 is to fulfil its function, here in particular as an exterior heat exchanger of a refrigerant circuit. In addition, the heat exchanger 15 may serve as a condenser, for example, in cooling operation or AC operation. AC stands for air conditioning. Alternatively, the first heat exchanger 15 may serve as a vaporiser in the heating operation or heat pump operation. In AC operation, the first heat exchanger 15 permanently emits heat, therefore the de-icing is not necessarily performed. In this case, the bypass channel 23 may be necessarily provided in order to increase the hypothermic degree of the first heat exchanger 15 as shown in FIG. 7A.

(5) In heat pump operation, the first heat exchanger 15 receives heat from the outside air and is cooled by the outside air. When a temperature of the outside air is 0° C. or lower, an air inlet portion of the first heat exchanger 15 may be frozen or frosted and therefore the air inlet portion is blocked. Such a state can be determined or predicted by various manners. For example, the first heat exchanger 15 may be determined to be possibly frozen or frosted, or may be determined to be frozen or frosted already, or a degree of freezing over (or a volume of the ice or the frost) may be determined based on at least one parameter such as the temperature of the outside air, humidity of the outside air, the pressure drop caused in the air inlet portion of the first heat exchanger 15, or optical data (e.g. camera images). Two or more parameters may be combined.

(6) In the above-described embodiment, the second heat exchanger 16 is disposed to supply heat to the air flowing therethrough, and the heated air flows into the first heat exchanger 15 to de-ice (or defrost) the first heat exchanger 15. However, there may be a case where the heat supply is insufficient only by the second heat exchanger 16 or a case where the second heat exchanger 16 is not disposed. For example, hot gas or heated air may be allowed to flow into the first heat exchanger 15. The hot gas may be generated by a PTC element (not shown). The heated air may be from a reservoir or a passenger compartment. A supply channel (not shown) may be provided for transferring the hot gas or the heated air.

Alternatively, it may not be necessary to heat the first heat exchanger 15 directly.

(7) The inlet opening 11 and the outlet opening 13 may be switched between being open and being closed with time. For example, the inlet opening 11 and the outlet opening 13 may be closed for a first time period and then may be open for a 1o second time period. This ventilation operation (i.e., an inrush ventilation) removes saturated air (and water content caused when ice or frost formed in the first heat exchanger 15 is melted, if required), therefore the first heat exchanger 15 can be dried effectively. In the second time period, cold air can be heated quickly by the circulation flow Z in order to continue the de-icing process if required.

The second time period may be shorter than the first time period. The second time period may be set very short (in the seconds range) while the first time period may be from several minutes to several tens of minutes.

(8) A water deposition opening (not shown) may be provided in a lower region of the air guiding housing 10. The water deposition opening is configured to emit the water content, which is caused when the ice or the frost is melted, without closing the inlet opening 11 and the outlet opening 13 to perform the inrush ventilation.

The water deposition opening may be configured to be heated preferably. By heating the water deposition opening, the water content having a low temperature can be prevented from being frozen again. For example, an electric auxiliary heater or a heat exchanger may be disposed to heat the water deposition opening. Specifically, warm air, which may be heated by waste heat from the electric auxiliary heater or a heat exchanger, may be used to heat the water deposition opening.

Thus, the water content such as melted or blown-away water can thus be removed from the closed air guiding housing 10 by the first heat exchanger 15 without being received as steam content by the circulation current. This avoids the situation of all the ice to be removed via the air as water vapour.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as departure from the disclosure, and all such modifications are intended to be included within the scope of the disclosure.

Example embodiments are provided so that this disclosure will be through, and will convey the scope to those who are skilled in the art. Numerous specific details are set forth such as examples of specific components, devices, and methods, to provide a through understanding of embodiments of the present disclosure. It will be apparent to those skilled in the art that specific details need not be employed, that example embodiments may be embodied in many different forms and that neither should be construed to limit the scope of the disclosure. In some example embodiments, well-known processers, well-known device structures, and well-known technologies are not described in detail.

The technology used herein is for the purpose of describing particular example embodiments only and is not intended to be limiting. As used herein, the singular forms "a," and "an," and "the" may be intended to include the plural forms as well, unless the context clearly indicates otherwise. The terms "comprises," "comprising," "including," and "having," are integers, steps, operations, elements, and/or components, but do not preclude the presence or addition of one or more other features, integers, steps, operations, elements, components, and/or groups thereof.

Spatially relative terms, such as "inner," "outer," "beneath," "below," "lower," "above," "upper," "front," "rear," "left," "right," "up," "down," and the like, may be used for ease of description to describe one element or feature's relationship to another element(s) or feature(s) as illustrated in the figures. Spatially relative terms may be intended to encompass different orientations of the device in use or operation in addition to the orientation illustrated in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The method steps, processers, and operations described herein are not to be construed as necessarily requiring their performance in the particular order discussed or illustrated, unless specifically identified as an order of performance. It is also to be understood that additional or alternative steps may be employed. As used herein, the terms "and/or" includes any and all combinations of one or more of the associated listed items.

The above-described embodiments may be summarized as set forth below. However, it should be understood that the present disclosure is not limited to the following descriptions.

In an embodiment, the at least one fan 21 can be arranged directly behind the first heat exchanger 15 (or, where necessary, further heat exchangers—see explanation below). When the inlet opening 11 and outlet opening 13 are closed, there is now no longer any airflow from outside 2, such that the corner and edge regions of the first heat exchangers 15 are no longer flowed through (air is only drawn through the circular fan cross-section). The air can flow back again via the corner and edge regions and thus enable the circulation.

In order to form a circulation flow Z, a partition wall 18 can furthermore be arranged relative to the at least one fan 21 in a simple manner in such a way that an opposing airflow direction is formed on both sides of the partition wall 18 when operating the at least one fan 21. In other words, a different pressure is constructed on both sides of the partition wall 18, which maintains an air circulation along the circulation flow Z. In this embodiment, the fan 21 does not necessarily have to be arranged directly behind the first heat exchanger 15.

In one embodiment of the present disclosure, a second heat exchanger 16, in particular a cooler (water cooler or general air coolant heat exchanger) is arranged between the inlet opening 11 and the outlet opening 13, said cooler dispensing heat to the introduced air. Further exchangers can also generally be arranged there, wherein, if necessary, the first heat exchanger 15 to be de-iced is not limited to be the heat exchanger arranged furthest behind. Arrangements of several heat exchangers one behind the other are also inherently known in and of themselves. With a closed air guiding housing 10, i.e. with a closed inlet opening 11 and a closed outlet opening 13, the temperature of the air forming the circulation flow Z is permanently increased by the presence of the second heat exchanger 16. As a result, more water vapour can be received in the circulating airflow and thus the first heat exchanger 15 can be de-iced more quickly. Here, it is not even necessary to heat the first heat exchanger 15 to be de-iced itself. Yet alternatively, other or further heat sources can also be used in the thus defined, closed circulation flow Z, i.e. also hot gas, which briefly flows through the first heat exchanger 15 to be de-iced, heat through the electric auxiliary heater or also hot air, which is briefly introduced from the passenger compartment into the otherwise closed air guiding housing 10.

For the de-icing function, the arrangement of the first and second heat exchangers 15, 16 relative to each other is possible in a different manner. The two heat exchangers 15, 16 can be advantageously arranged one behind the other, in particular when they have a similarly dimensioned surface for air passage. Alternatively, more than two heat exchangers can also be arranged in the air guiding housing 10 and these can also be arranged next to each other, one above the other or angled relative to each other, depending on how this fits the best for the specific heat exchanger aggregate. The present disclosure is based on the present heat being distributed in the closed circuit for the de-icing function and adjusted in such a way that de-icing is possible.

According to one embodiment of the present disclosure, the at least one partition wall 18 divides the surface to be flowed through of the at least one heat exchanger into at least two regions and/or the surfaces to be flowed through of several heat exchangers flowed through in parallel into at least two regions. Here, the partition wall 18 is arranged asymmetrically relative to the at least one fan 21, e.g. laterally offset. The partition wall 18 arranged in such a way does not need any additional construction space. This enables a space-saving construction, without enlarging existing arrangements in terms of their external dimensions. As a result of the asymmetrical arrangement, it emerges that an opposing airflow direction is formed on both sides of the at least one partition wall 18 when operating the at least one fan 21, or a different pressure is constructed and thus a circulation current is formed.

It can advantageously be provided that at least one partition wall 18 is arranged in the region of a lateral end of the at least one heat exchanger, whereby a main channel 19 and at least one side channel 20 are formed, and the fan 21 is arranged in the region of the main channel 19. The side channels 20 can also be formed on the two lateral ends. In particular for heat exchangers with a non-square surface, the lateral regions, which are not in the direct current cross-section of the fan 21, can thus be used as side channels 20, via which the air flows back in the opposite direction.

According to an advantageous embodiment of the present disclosure, it is provided that the fan 21 is arranged behind the at least one heat exchanger in the flow direction D from the inlet opening 11 in the direction of the outlet opening 13, and a pivotable plate door 22 (or guide plate) is provided. At a first pivoting position, this plate door 22 directs the airflow (seen from the inlet opening 11 in the direction of the outlet opening 13) from the side channel 20 to the fan 21 and, at a second pivoting position, represents an extension of the at least one partition wall 18 up to the fan edge region. In the first pivoting position, the plate door 22 thus represents a funnel-shaped casing or fan frame in order to support as homogeneous an airflow as possible with an open inlet opening 11 and outlet opening 13 through the whole cross-section through the heat exchanger(s). At the second pivoting position—with a closed inlet opening 11 and outlet opening 13—the side channel 20 is separated between the first heat exchanger 15 to be de-iced and the fan 21, and then thus to the back channel for the circulation flow.

In a further embodiment of the present disclosure, it is provided that the partition wall 18 is arranged laterally next to the at least one heat exchanger, such that a lateral bypass channel 23 is formed. A closing mechanism is then provided in the bypass channel 23, by means of which closing mechanism the bypass channel 23 can be closed when the inlet opening 11 and outlet opening 13 are open. A return channel for a circulation flow can also be achieved by this bypass channel 23. In order to avoid the air passing through unnecessarily flowing past, this bypass can thus be closed in normal operation. A respective bypass channel 23 can be provided on each side.

Advantageously, the closing mechanism of the bypass channel 23 comprises a flap 24, which closes in the flow direction D (from the inlet opening 11 in the direction of the outlet opening 13) and/or is pre-tensioned in the flow direction D. When the outside air is flowing through normally, the resistance of the flap 24 can be adjusted sufficiently by the pretension that this seals the bypass channel 23. Yet by closing the inlet opening 11 and outlet opening 13, the bypass channel 23 is supplied from the opposite direction by the circulation flow Z setting in, whereby said bypass channel 23 is opened automatically. An active setting by a multiphase motor, for example, is not necessary.

In a further embodiment of the present disclosure, it can be provided that the closing mechanism of the bypass channel 23 can be set in at least two open states. A first open state guides the bypass channel 23 past at least two heat exchangers 15, 16 arranged one behind the other, and a second open state closes the bypass channel 23 in front of the first heat exchanger 15 at the back, such that only the front heat exchanger(s) is/are bypassed by the bypass channel 23. In the case of more than two heat exchangers arranged one behind the other, other switching patterns can also be simply achieved, such that the first or, optionally, the first and second heat exchangers 15, 16 are bypassed. Depending on the operating mode, it can be advantageous that not all heat exchangers are flowed through. Only one region formed as a hypothermic section of the heat exchanger can also be flowed through, in particular with a heat exchanger at the back. This is advantageous in a cooling operation (AC-operation, AC=air conditioning), for example.

A method for de-icing a heat exchanger in an arrangement mentioned above is specified, in which the following steps are carried out.

closing the inlet opening 11 and outlet opening 13, and introducing measures for forming an air circulation in the air guiding housing 10, wherein the bypass channel 23 is optionally opened and/or the at least one fan 21 is operated in such a way that a different pressure is constructed on the two sides of the at least one partition wall 18.

In terms of the present disclosure, closing also comprises a significant reduction of the degree of opening. Smaller leakages are permitted here because, as a result of the dynamic pressure, the inlet opening 11 and, as a result of the operation of the at least one fan 21, the outlet opening 13 are not always completely sealed in practice in any embodiments. A small leakage may be desirable in order to thus enable a small supply of fresh air and removal of the air saturated with water vapour.

Typically, heat can be supplied into the closed-off air guiding housing 10, for example via waste heat from the cooling water, from briefly hot refrigerant in the first heat exchanger 15, by an electric auxiliary heater, from interior air supplied or another heat reservoir.

According to an embodiment of the method according to the present disclosure, the inlet opening 11 and the outlet opening 13 can extensively be opened for a second time period after the end of a first time period when operating with a closed inlet opening 11 and outlet opening 13, wherein the second time period is shorter than the first time period. This inrush ventilation allows the saturated air and, where necessary, the thawed water to be removed from the circulation circuit in order to enable a better drying of the heat exchanger.

The necessity for de-icing can be detected either by diverse operating parameters—for example by the optical detection of freezing over, a drop in pressure at the heat exchanger to be de-iced or by a temperature signal. Alternatively, a de-icing operation can also regularly be carried out prophylactically under certain conditions.

What is claimed is:

1. An arrangement for de-icing a heat exchanger in a motor vehicle, the arrangement comprising:
    an air guiding housing that includes an inlet opening and an outlet opening, the air guiding housing being configured to take in an air from an outside of the motor vehicle through the inlet opening and to discharge the air from the outlet opening; and at least one fan that is positioned between the inlet opening and the outlet opening inside the air guiding housing and that is configured to circulate the air in the air guiding housing, wherein the heat exchanger is positioned between the inlet opening and the outlet opening inside the air guiding housing and allows the air to pass therethrough, thereby being configured to cool the air, the inlet opening and the outlet opening each are configured to be closed, and the air guiding housing is configured to cause a circulation flow therein when the at least one fan is operated while the inlet opening and the outlet opening are closed, wherein the arrangement further comprises:
a partition wall that is positioned in the air guiding housing and that is configured to cause the circulation flow, wherein the partition wall is positioned in an end portion of the heat exchanger, the partition wall, together with the air guiding housing, defines
a side channel that allows the air to flow therethrough and to pass through the end portion and
a main channel that allows the air to flow therethrough and not to pass through the end portion, and the at least one fan faces the main channel along a flow direction along which the air flows from the inlet opening to the outlet opening.

2. The arrangement for de-icing a heat exchanger according to claim 1, the arrangement further comprising
a second heat exchanger that is housed in the air guiding housing and that is positioned between the inlet opening and the outlet opening, wherein
the second heat exchanger is configured to allow the air to pass therethrough and is configured to transfer heat to the air.

3. The arrangement for de-icing a heat exchanger according to claim 2, further comprising
a partition wall that is positioned in the air guiding housing and that is configured to cause the circulation flow, wherein
the at least one fan includes a first fan and a second fan, the partition wall defines
a first passage that allows the air to flow therethrough and to pass through the first heat exchanger and
a second passage that allows the air to flow therethrough and to pass through the second heat exchanger, and
the partition wall is positioned asymmetrically relative to one of the first fan and the second fan.

4. The arrangement for de-icing a heat exchanger according to claim 2, further comprising
a partition wall that is positioned in the air guiding housing and that is configured to cause the circulation flow, wherein
the at least one fan includes a first fan and a second fan, the partition wall is centrally arranged and divides a surface of the first heat exchanger into a first surface and a second surface and divides a surface of the second heat exchanger into a third surface and a fourth surface,
the partition wall defines
a third passage that allows the air to flow therethrough and to pass through the first surface area and the third surface area and
a fourth passage that allows the air to flow therethrough and to pass through the second surface area and the fourth surface area
the partition wall is positioned asymmetrically relative to one of the first fan and the second fan.

5. The arrangement for de-icing a heat exchanger according to claim 1, the arrangement further comprising
a plate door that is rotatable, wherein
the at least one fan is located downstream of the heat exchanger in a flow direction along which the air flows from the inlet opening to the outlet opening, and
the plate door is configured to be switched between
a first position where the plate door guides the air flowing through the side channel to flow into the at least one fan and
a second position where the plate door connects to the partition wall to extend the side channel to a radial end of the at least one fan.

6. The arrangement for de-icing a heat exchanger according to claim 1, wherein
the partition wall divides a surface of the heat exchanger into a first side surface and a first main surface,
the side channel allows the air to flow therethrough and to pass through the first side surface,
the main channel allows the air to flow therethrough and to pass through the first main surface, and
the partition wall is positioned asymmetrically relative to the at least one fan.

7. The arrangement for de-icing a heat exchanger according to claim 2, the arrangement further comprising
a partition wall that is positioned in the air guiding housing and that is configured to cause the circulation flow; and
a switching device that is configured to open and close a bypass channel, wherein
the partition wall is positioned between the air guiding housing and at least one of the first heat exchanger and the second heat exchanger in a direction perpendicular to a flow direction along which the air flows from the inlet opening to the outlet opening,
the bypass channel is defined between the partition wall and the air guiding housing and allows the air to flow therethrough while bypassing the at least one of the first heat exchanger and the second heat exchanger, and
the switching device closes the bypass channel when the inlet opening and the outlet opening are open.

8. The arrangement for de-icing a heat exchanger according to claim 7, wherein
the switching device includes a flap that is configured to receive a tension pulling the flap along the flow direction.

9. The arrangement for de-icing a heat exchanger according to claim 7, wherein
the first heat exchanger and the second heat exchanger are arranged along the flow direction such that the first heat exchanger is located downstream of the second heat exchanger,
the partition wall includes
a first partition wall that is positioned between the first heat exchanger and the air guiding housing, extends along the flow direction, and defines a first bypass channel together with the air guiding housing, the first bypass channel allowing the air to flow therethrough while bypassing the first heat exchanger and
a second partition wall that is positioned between the second heat exchanger and the air guiding housing, extends along the flow direction, and defines a second bypass channel together with the air guiding housing, the second bypass channel allowing the air to flow therethrough while bypassing the second heat exchanger, when the inlet opening and the outlet opening are open, the switching device is configured to be positioned selectively at a first open position where the switching device closes the first bypass channel to allow the air to flow through the second bypass channel and to flow into the first heat exchanger without flowing into the first bypass channel, a second open position where the switching device closes the first bypass channel and the second bypass channel to allow the air to flow through the first heat exchanger and the second heat exchanger.

10. A method for de-icing a heat exchanger in an arrangement according to claim 7, the method comprising:

closing the inlet opening and the outlet opening; and forming the circulation flow in the air guiding housing, wherein the bypass channel is optionally open and/or the fan is operated to cause a pressure difference between one side and an other side of the partition wall.

11. The method for de-icing a heat exchanger according to claim 10, wherein heat is supplied to the air guiding housing when the inlet opening and the outlet opening are closed.

12. The method for de-icing a heat exchanger according to claim 10, wherein the inlet opening and outlet opening are configured to be open temporarily for a second time period after being closed for a first time period, and the second time period is shorter than the first time period.

* * * * *